Patented Feb. 8, 1938

2,107,941

UNITED STATES PATENT OFFICE 2,107,941

FAST BROWN LEATHER DYESTUFFS AND A PROCESS OF PREPARING THEM

Fritz Hess, Karl Hager, and Walter Pense, Frankfort-on-the-Main-Hochst, Germany, assignors to General Aniline Works, Inc., New York, N. Y., a corporation of Delaware No Drawing. Application November 26, 1935, Serial No. 51,680. In Germany November 30, 1934

4 Claims. (Cl. 260—56)

The present invention relates to fast brown leather dyestuffs and to a process of preparing them.

We have found that by condensing one mol. of a benzo-quinone compound, for instance, benzoquinone, toluquinone or chloranil, with two mols of a diphenylamine-sulfonic acid containing at least two sulfo groups, for instance, a disulfonic acid or trisulfonic acid, and which contains in the one phenyl nucleus a nitro group and in the other phenyl nucleus an amino group, there are obtained fast brown leather dyestuffs which have the valuable property of penetrating deeply into the leather during the dyeing process and of dyeing in many cases even the whole core of the leather. This favorable effect could not be expected in view of the large size of the dyestuff molecule. The dyestuffs are new. There are obtained, for instance, dyestuffs of the following general formula:

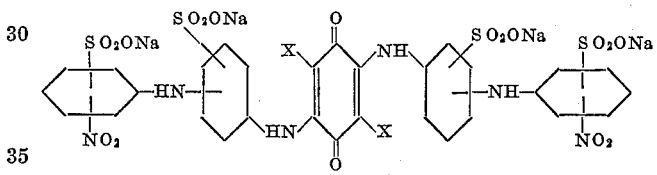

wherein X means hydrogen, methyl or chlorine.

The following examples serve to illustrate the invention, but they are not intended to limit it thereto, the parts being by weight:

(1) The aqueous solution of the nitroaminodiphenylaminedisulfonic acid, obtainable by condensing 37.6 parts of 1.4-diaminobenzenesulfonic acid and 47.5 parts of 4-nitrochlorobenzenesulfonic acid in a solution alkaline with sodium carbonate, is stirred, for 8 hours at 50° C., with 25 parts of toluquinone and 20 parts of pyrolusite of 85 per cent. strength in the form of powder. The solution which is at first yellowish-red becomes a deep brown; it is filtered after the time indicated. The filtrate is rendered acid to Congo paper by means of hydrochloric acid, whereby the dyestuff acid is precipitated. It is filtered with suction, rendered alkaline by means of sodium carbonate or ammonia and evaporated. About 75 parts of leather dyestuff are obtained. The dyestuff has the following constitution:

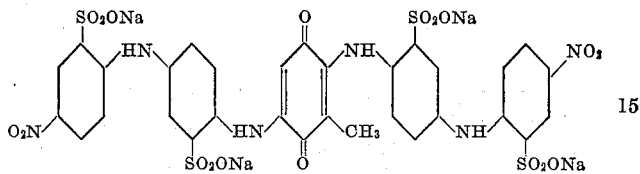

(2) The aqueous solution of the dinitro-aminodiphenylamine-disulfonic acid, obtainable by condensing in a solution alkaline with sodium carbonate 19 parts of 1,4-diaminobenzenesulfonic acid with 29 parts of 1-chloro-2.6-dinitrobenzenesulfonic acid, is stirred for 8 to 10 hours at 50° C. with 13 parts of toluquinone and 15 parts of a pyrolusite powder of 85 per cent. strength. The deep brown solution thus obtained is filtered and sodium chloride is added. The dyestuff which is thus salted out is filtered with suction and dried. 45 parts of leather dyestuff are obtained. The dyestuff has the following constitution:

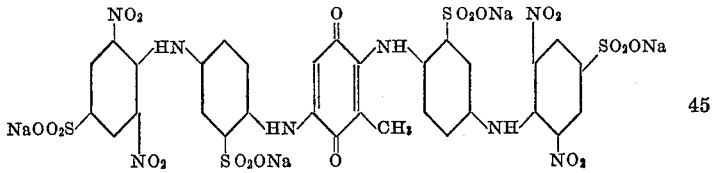

If 1-chloro-2,4-dinitrobenzenesulfonic acid is substituted for the 1-chloro-2,6-dinitrobenzenesulfonic acid, the process takes an analogous course.

(3) The condensation product from 27 parts of 1,4-diaminobenzenedisulfonic acid and 24 parts of 4-nitrochlorobenzenesulfonic acid is stirred in an aqueous solution with addition of 6 parts of calcined sodium carbonate for several hours at 50° C. to 60° C. with 12.5 parts of chloranil. The solution which is at first yellow becomes a dark brown. It is filtered and the filtrate is evaporated.

(4) To an aqueous solution of the condensation product from 19 parts of 1,3-diaminobenzene-sulfonic acid and 26 parts of the sodium salt of 4-nitrochlorobenzenesulfonic acid, there are added, while stirring, 16.5 parts of toluquinone in the form of a paste and 10 parts of pyrolusite of 85 per cent. strength and the mass is kept for 10 hours at 50° C. to 55° C.; it is then filtered hot, the filtrate is rendered acid to Congo paper by means of hydrochloric acid and the dyestuff which is precipitated is filtered by suction. The solid matter is rendered feebly aklaline and evaporated. 50 parts of a dyestuff are obtained which dyes leather deep brown tints.

(5) By using in the preceding example instead of toluquinone and pyrolusite, 12 parts of chloranil and 6 parts of sodium carbonate and boiling for 20 hours, a deep brown solution is obtained, which is evaporated to dryness. 55 to 60 parts of the product are obtained which dyes leather brown tints. The dyestuff has the following constitution:

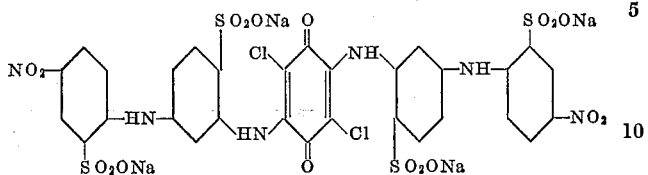

We claim:
1. The compounds of the general formula:

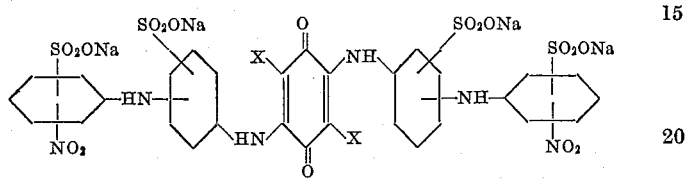

wherein X means a member of the group consisting of hydrogen, methyl and chlorine, dyeing leather brown tints of good fastness properties.

2. The compound of the formula:

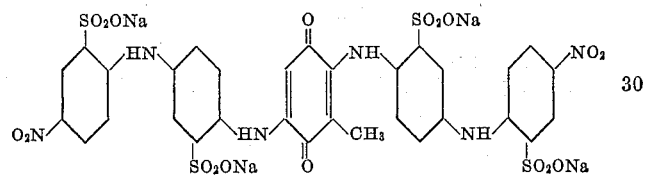

which represents a fast brown leather dyestuff having the valuable property of penetrating deeply into the leather during the dyeing process.

3. The compound of the formula:

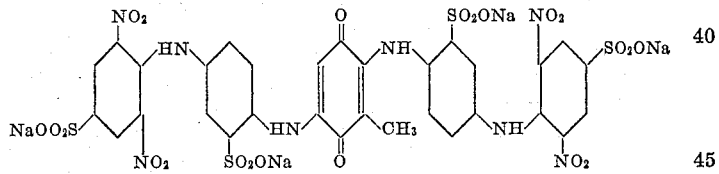

being a fast brown leather dyestuff which has the valuable property of penetrating deeply into the leather during the dyeing process.

4. The compound of the formula:

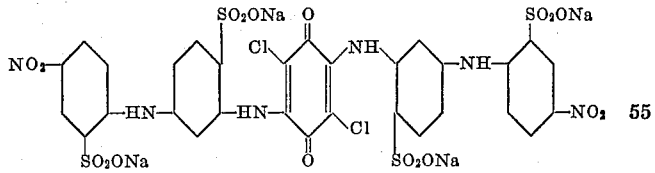

being a fast brown leather dyestuff which has the valuable property of penetrating deeply into the leather during the dyeing process.

FRITZ HESS.
KARL HAGER.
WALTER PENSE.